US011924956B2

(12) United States Patent
Miles et al.

(10) Patent No.: US 11,924,956 B2
(45) Date of Patent: Mar. 5, 2024

(54) SYSTEMS AND METHODS FOR THOMSON SCATTERING BACKGROUND INTERFERENCE SUPPRESSION

(71) Applicant: The Texas A&M University System, College Station, TX (US)

(72) Inventors: Richard B. Miles, College Station, TX (US); Christopher Limbach, College Station, TX (US); Alexandros Gerakis, Attica (GR)

(73) Assignee: The Texas A&M University System, College Station, TX (US)

( * ) Notice: Subject to any disclaimer, the term of this patent is extended or adjusted under 35 U.S.C. 154(b) by 273 days.

(21) Appl. No.: 17/353,994

(22) Filed: Jun. 22, 2021

(65) Prior Publication Data

US 2021/0410263 A1 Dec. 30, 2021

Related U.S. Application Data

(60) Provisional application No. 63/043,460, filed on Jun. 24, 2020.

(51) Int. Cl.
*H05H 1/00* (2006.01)

(52) U.S. Cl.
CPC ........ *H05H 1/0037* (2013.01); *H05H 1/0018* (2013.01)

(58) Field of Classification Search
CPC ........................... H05H 1/0037; H05H 1/0018
USPC .......................................................... 356/316
See application file for complete search history.

(56) References Cited

U.S. PATENT DOCUMENTS

2004/0021920 A1* 2/2004 Psaltis ...................... G03H 1/28 359/15
2019/0212196 A1* 7/2019 Miles .................... G01J 3/4412

FOREIGN PATENT DOCUMENTS

JP 2018048825 A * 3/2018
KR 101801087 B1 * 11/2017 ......... G01N 15/0205
SU 895200 A * 8/1983

* cited by examiner

*Primary Examiner* — Michael A Lyons
*Assistant Examiner* — Omar H Nixon
(74) *Attorney, Agent, or Firm* — Conley Rose, P.C.

(57) ABSTRACT

An apparatus for measurement of Thomson scattering signals from a plasma includes a light emitting device, configured to emit a light beam into the plasma, along an axis. In addition, the apparatus includes a collector configured to collect the Thomson scattering from the plasma at an angle less than 90 degrees from the axis of the light beam. Further, the apparatus includes a sensor assembly to detect the Thomson scattering.

23 Claims, 7 Drawing Sheets

SYSTEMS AND METHODS FOR THOMSON SCATTERING BACKGROUND INTERFERENCE SUPPRESSION

CROSS-REFERENCE TO RELATED APPLICATIONS

This application claims benefit of U.S. provisional patent application Ser. No. 63/043,460 filed Jun. 24, 2020, and entitled "Systems and Methods for Thompson Scattering Background Interference Suppression," which is hereby incorporated herein by reference in its entirety.

STATEMENT REGARDING FEDERALLY SPONSORED RESEARCH OR DEVELOPMENT

This invention was made with government support under N00014-20-1-2348 awarded by the U.S. Office of Naval Research. The government has certain rights in the invention.

BACKGROUND

Weakly ionized plasmas are used in a wide range of commercial applications including materials processing, lighting, and propulsion, as well as for wound healing and cancer treatment. In high-speed aerodynamics, such as during re-entry into the Earth's atmosphere as part of a spaceflight mission, plasma sheaths can interrupt communication and plasma related reactions can destroy leading edges and thermal protection materials.

Plasmas comprise ionized gases and can also include neutral particles and radicals, as well as ions and electrons. As used herein a "weakly ionized plasma" refers to plasmas in which the electron density is less than ~1% of the gas density. Weakly ionized and low temperature plasmas may be created by a variety of mechanisms including direct electron beam excitation, combustion, shock waves, electrical discharges (e.g., direct current—DC), radio frequency (RF) discharges, and pulsed high voltage discharges.

In many cases a plasma (e.g., a weakly ionized plasma) may not be at thermal equilibrium, and may have electron temperatures far exceeding neutral gas and ion temperatures. Dynamic energy transfer and chemical reaction processes may therefore occur within such plasmas, often on nanosecond timescales. Even at low density, the electrons within a plasma create a unique environment which causes the gas to be conductive and thereby facilitates the transfer of energy to excited atomic and molecular states. This may lead to spectral emission, greatly enhanced chemical reactivity and may enable electromagnetic interactions. In addition, plasma sheaths near surfaces can generate large acceleration fields, providing high energy ion bombardment for surface cleaning and reactive surface processing.

BRIEF SUMMARY

Some embodiments disclosed herein include an apparatus for measurement of Thomson scattering signals from a plasma. In an embodiment, the apparatus includes a light emitting device, configured to emit a light beam into the plasma, along an axis. In addition, the apparatus includes a collector configured to collect the Thomson scattering from the plasma at an angle less than 90 degrees from the axis of the light beam. Further, the apparatus includes a sensor assembly to detect the Thomson scattering.

Other embodiments disclosed herein include a method for measuring Thomson scattering signals from a plasma. In an embodiment, the method includes emitting a light beam into plasma along an axis. In addition, the method includes collecting the Thompson scattering from the plasma at an angle less than 90° from the axis. Further, the method includes detecting the collected Thompson scattering with a sensor assembly.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
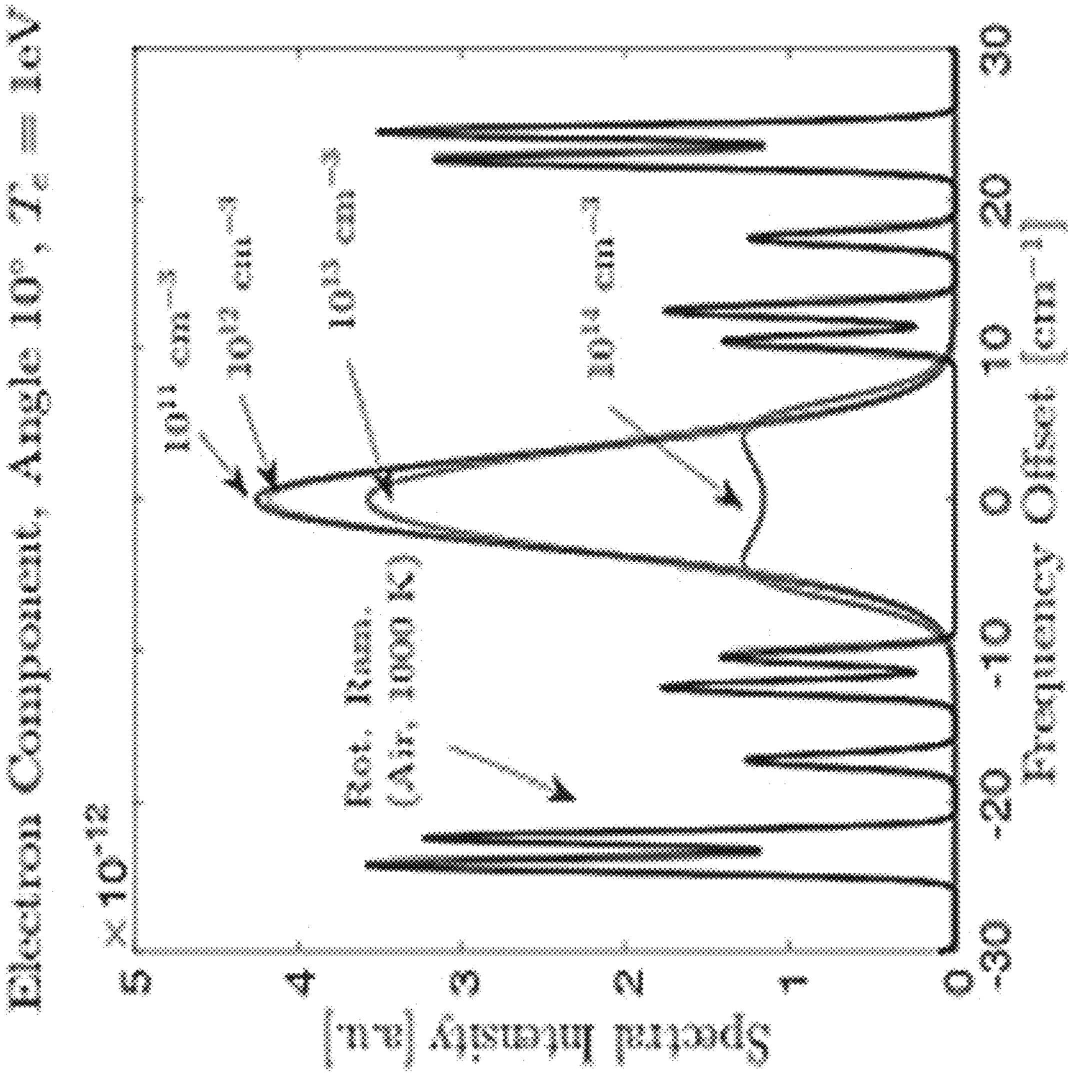
FIGS. 1 and 2 are plots of a predicted electron Thomson scattering spectral features according to some examples.

As previously described, plasmas (e.g., weakly ionized plasmas) are used in a wide range of applications and may have significant negative impacts in some circumstances. Thus, it may be desirable to measure parameters and properties of the plasma. However, measuring properties of such plasmas often may not be accomplished with standard probes since they perturb the plasma and in many cases may not survive the plasma environment itself. As a result, stand-off measurement methods may be a useful alternative in these circumstances.

Accordingly, embodiments disclosed herein include systems and methods for improved stand-off detection of electron properties in a plasma (e.g., a weakly ionized plasma, low temperature plasma, ionized gas region). In some embodiments, the systems and methods disclosed herein may utilize a laser (e.g., a narrow line width laser) or light source to measure properties of a plasma. In particular, the measurement of the spectral signature associated with the electron scattering of the laser light, broadened by the Doppler shifts associated with the motion of the electrons, may be utilized to determine one or more properties or features of the plasma environment. Since the scattering is linearly related to the illumination source, either pulsed or continuous illumination can be utilized. This scattering is referred to herein as Thomson scattering.

A stand-off measurement of electron density and temperature in a weakly ionized plasma based on Thomson scattering may be limited by background interference from Rotational Raman scattering and Rayleigh scattering in weakly ionized air or other neutral gas plasmas. Background luminosity from the plasma or ionized gas region may also interfere with the Thomson scattering. More particularly, the broad spectral width of the Thomson scattering limits the potential for spectrally filtering out the background interference. Accordingly, in the systems and methods disclosed herein the Thomson scattering is collected so as to suppress background interference from Rotational Raman scattering, Rayleigh scattering, and from luminosity and thus extend significantly the low electron density limit of Thomson scattering. In some embodiments, the illumination source for detecting parameters and properties of a plasma comprises a laser; however, similar advantages may be possible with incoherent narrow linewidth atomic line sources such as narrow linewidth mercury, rubidium, cesium, sodium, potassium or other atomic vapor lamps. Accordingly, use of a laser as the illumination source may describe only some of the embodiments contemplated herein. To further explain the embodiments disclosed herein, a brief discussion of Thomson scattering is provided below.

Thomson scattering arises from the scattering of photons from free electrons and ions. When a weakly ionized plasma or ionized gas region is illuminated with a narrow linewidth laser (or other suitable illumination source), the Thomson scattering spectrum reveals the motion of the electrons and ions due to Doppler shifts of the scattered laser light and it reveals the density due the linearity of the scattering intensity.

The spectrum of the collected Thomson scattering is affected by the collection angle through the scattering wavelength. The scattering wavelength, $\lambda_s$, arises from a virtual interference pattern associated with the propagation vector of the illumination laser, $\overline{k_L}$, and the propagation vector to the collection optics, $\overline{k_C}$, where $$|k| = \frac{2\pi}{\lambda}.$$

$$\vec{k_s} = \vec{k_L} - \vec{k_C} \text{ and} \tag{1}$$

$$\lambda_s = \frac{2\pi}{|\vec{k_s}|} \tag{2}$$

The magnitudes of $k_L$ and $k_C$ are essentially the same and equal to $$\frac{2\pi}{\lambda_L}$$

where $\lambda_L$ is the wavelength of the laser, so if the angle between the propagation direction of the laser and the direction from the scattering region to the collection optics is $\theta$, then $$|\vec{k_s}| = \frac{2\pi}{\lambda_L} 2\sin\left(\frac{\theta}{2}\right) \text{ and} \tag{3}$$

-continued $$\lambda_s = \frac{\lambda_L}{2\sin\left(\frac{\theta}{2}\right)} \tag{4}$$

This is similar to Rayleigh scattering, which has a dependence on the same k vector relationship as described above. The spectrum of Raman scattering, on the other hand, is not affected by the collection angle. This difference is due to the Doppler shift associated with thermal motion broadening of the Rayleigh and Thomson scattering spectra, whereas the Raman scattering spectrum arises from frequency shifts associated with internal modes of the molecules. To the degree that the linewidth of each individual Raman line is affected by thermal motion, each separate line also experiences narrowing for forward collection, reaching a limit at 0 angle determined by the difference between the frequency of the illumination source and the frequency of the Raman emission. In the backward direction Thomson, Rayleigh and Raman linewidths are greatly increased. For Thomson and Rayleigh scattering, in the forward direction, the observed Doppler shift for all velocity components is zero, since the sensitivity to the velocities of the electrons is related to the value of $\overline{k_s}$, which decreases to zero for forward scattering. This can be understood since at a zero angle (that is a zero angle relative to an axis of the laser beam directed through the plasma or ionized gas region), the phase advance or delay of the scattered light emitted from each electron, ion or particle is just offset by the phase delay or advance of the incident light seen to be arriving by each electron, ion or particle. As the collection angle approaches zero, the Thomson and Rayleigh spectra collapse around the illumination laser frequency. Thomson, Rayleigh and Raman scattering only occur when the illumination source is on, so short pulsed sources can be used to sample at selected times and freeze time varying phenomena. Short pulses also enable rejection of background luminosity by time gating the detection apparatus.

At a 90° collection angle (that is 90° relative to the axis of the laser directed through the plasma), the electron Thomson scattering is very broad and overlaps the Rotational Raman Spectrum of molecular species as well as the ion Thomson scattering and Rayleigh scattering that are present in the weakly ionized gas. By moving the collection to angles below 90° (e.g., such as less than about 15°, less than about 10°, less than about 5°, or from about 5° to about 10° relative to the axis of the laser directed through the plasma or ionized gas region), the Thomson scattering spectrum can be collapsed far enough to fall within a spectral region that has no (or little) interference from either Rayleigh or Rotational Raman spectral features. At these smaller collection angles, the narrower Rayleigh and ion Thomson scattering spectra also collapse and become more easily eliminated by narrow linewidth spectral filters. Thomson scattering is wavelength independent, whereas Rayleigh and Raman scattering are strongly wavelength dependent, increasing significantly at shorter wavelength, so a reduction of Rayleigh and Raman background is achieved by operating at long wavelength, typically in the near infrared compared to the visible or ultraviolet.

For very low density plasmas and low density ionized gases, the motion of the electrons reflects the electron energy distribution function, but for higher densities, that motion is coupled to the ion acoustic waves, and strong sidebands appear in the electron Thomson spectrum reflecting the ion acoustic wave propagation velocity. The transition from the spectrum reflecting the electron energy distribution to that reflecting the ion acoustic wave is captured by a, the ratio of the scattering wavelength, A and the Debye length, $\lambda_D$:

$$\alpha = \frac{\lambda_s}{2\pi\lambda_D} \quad (5)$$

Ion acoustic waves become dominant for $\alpha>1$. The angular dependence of $\lambda_s$ leads to an increase in $\alpha$ for Thomson scattering collected in the forward direction. As the electron density decreases, the Debye length increases and a becomes smaller. There are also ion Thomson scattering spectral components, however, because ions are over a thousand times heavier than electrons and usually have a much lower kinetic temperature, their spectral features are much closer to the illumination laser frequency and normally overlap the Rayleigh scattering from neutral atoms and molecules.

The effect of the spectral narrowing with collection angle can be seen in FIG. 1, where the collection angle is assumed to be 10 degrees and the electron temperature is 1 electron volt (1 electronvolt—eV). Not shown in this figure is the very narrow but very strong Rayleigh (and ion Thomson) scattering at very close to zero offset from the laser. Note that at this collection angle the electron Thomson scattering falls at lower frequency offset from the laser than the lowest Rotational Raman lines of oxygen and nitrogen in air. At the higher electron densities the curve shape changes due to the increase in $\alpha$ and the ion acoustic wave peaks become apparent (the curve indicated with the electron density of $10^{14}$ $cm^{-3}$ in FIG. 1). At the lower electron densities, the spectrum reflects the electron temperature, which in this case is assumed to have a Gaussian profile. It should be noted that 1 $cm^{-1}$ is equal to 30 GHz so the full width at half maximum of the electron spectrum under these conditions is approximately 8 $cm^{-1}$ or approximately 240 GHz. The measurement of this linewidth will give the electron temperature, and any variations in the shape of the curve will give the electron energy distribution function.

Figure 2:
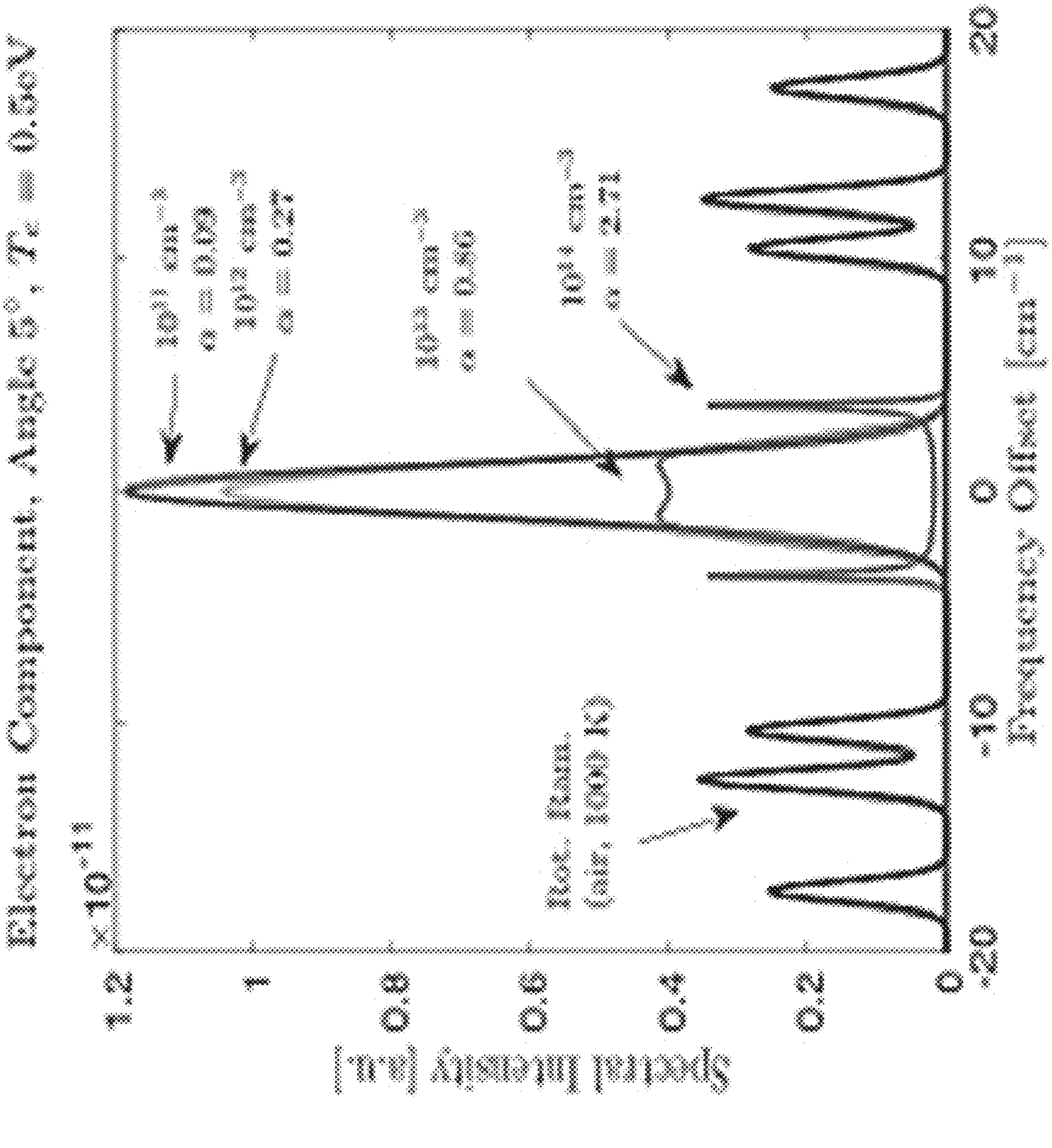

Referring now to FIG. 2, in which a similar prediction of spectral features for electrons with the collection angle reduced to 5 degrees and the electron temperature reduced to 0.5 eV is shown. Note that in FIG. 2, the electron Thomson scattering spectral features are narrowed and the tails of the electron Thomson scattering no longer overlap the lowest Raman lines in air. FIGS. 1 and 2 indicate that the spectral width of the electron Thomson scattering can be narrowed to an arbitrary degree, providing the capability to remove the Rotational Raman interference. The solid angle available for light collection decreases in the more forward direction, so an optimum angle that balances the elimination of interference and the solid angle of collection may be established based on the rotational Raman features background luminosity and the electron temperature. Note that the amplitudes of the spectral features in FIGS. 1 and 2 are not to scale but have been amplified for the low electron densities so that comparisons can be made.

The spectral narrowing associated with the forward Thomson scattering also enables more efficient spectral filtering of background luminosity from the plasma or ionized gas. The luminosity is independent of the collection angle, so in the forward direction the ratio of the Thomson linewidth to the linewidth of the luminosity is greatly reduced and spectral filtering is much more effective. Since the Thomson scattering occurs without significant delay and is linear with regard to the illumination energy, further suppression of the luminosity is achieved by time gating the collection detection system to overlap the Thomson scattering for pulsed illumination, or, if a continuous illumination source is used, the source can be modulated and the Thomson scattering detected by lock-in detection methods.

The ability to make the forward scattering measurement may call for highly selective spectroscopy in order to remove the Rayleigh and Thomson ion scattering as well as the nearby Rotational Raman lines. Assuming the source is a laser, elimination of the direct laser beam is assumed, but forward scattering of the laser from optical elements may still lead to some laser light interference. Elimination of this laser light as well as the Rayleigh and ion Thomson scattering and simultaneous spectral resolution of the narrowed electron Thomson scattering spectrum can be achieved with high resolution spectrometers and with highly selective filters including holographic filters and atomic filters. In some embodiments, an atomic filter is employed for the suppression of unwanted Rayleigh scattering and ion Thomson scattering and the spectral separation of Raman scattering. A feature of Thomson, Raman, and Rayleigh scattering is that the absolute wavelength of the scattering is determined by the offset from the illuminating laser wavelength. Thus by selecting the wavelength of the laser, the Rayleigh, Raman, and Thomson wavelengths can be selected. This feature allows the tuning of the electron Thomson scattering to overlap an atomic resonance in an atomic vapor cell or a holographic filter incorporated into the light collection optics. The Thomson scattering cross section is independent of wavelength, whereas Rayleigh and Raman are proportional to the inverse fourth power of the wavelength. Thus choosing an illumination wavelength in the near infrared rather than the visible or ultraviolet enhances the Thomson scattering relative to the Rayleigh and Raman. Atomic filters that can be very effective for wavelength selection in the infrared include cesium (852 and 894 nm), potassium (766 and 770 nm), and rubidium (780 and 795 nm). In general, other atomic and molecular species may also be considered, including sodium, mercury, and molecular iodine. Any atomic or molecular vapor that has strong absorption features in the infrared, visible or ultraviolet can be utilized.

In some embodiments, the high dispersion of the atomic vapor near the resonant absorption feature may be employed. Such a resonance may occur in rubidium vapor at 780 nm. This wavelength reachable by commercially available narrow linewidth Ti:sapphire or dye lasers. A rubidium cell has strong absorption over a range of about 9 GHz. Placing the laser wavelength in the absorption region of the atomic vapor eliminates the few GHz wide Rayleigh and Ion Thomson scattering as well as the direct laser scattering from widows and walls if present. A collection angle of 10 degrees may be selected to suppress the rotational Raman scattering from nitrogen and oxygen molecules in air. It is apparent from FIG. 1 that the electron Thomson scattering is broadened well beyond the 8 GHz, so most of the curve falls into the transparent region of the rubidium cell and sees very strong dispersion. This high dispersion provides the capability to configure the atomic vapor in a prism cell such that the light entering the cell is refracted due to the very strong dispersion near the atomic resonance feature.

Figure 3:
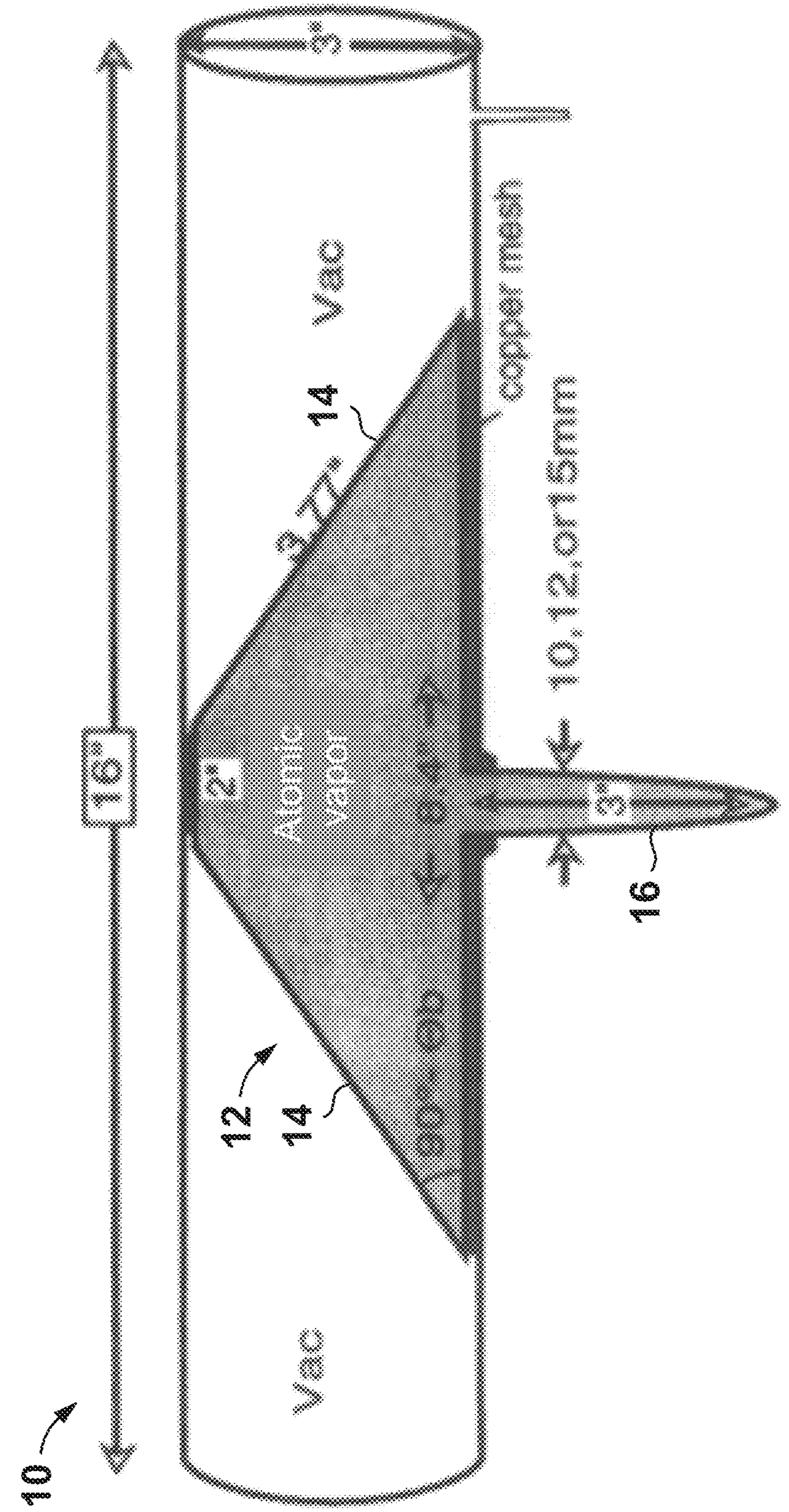
FIG. 3 is a schematic diagram of an atomic vapor prism according to some examples.

FIG. 3 shows a diagram of an atomic vapor cell 10 according to some embodiments. While various dimensions and features are highlighted in the atomic vapor cell 10 of FIG. 3, these dimensions and features are meant to illustrate some embodiments and should not be interpreted as limiting all potential embodiments of an atomic vapor cell 10. In general the cell 10 can comprise one or more atomic vapor prisms or it can be made with solid quartz or glass prisms placed within a surrounding atomic vapor to increase the total dispersion and provide greater spectral measurement capabilities.

In particular, in some embodiments cell 10 includes a vapor prism 12 comprising a pair of opposing slanted or angled windows 14. The angled windows 14 serve as high transmission Brewster angle windows for light passing into the vapor cell and also act as the slanted sides of the vapor prism 12. Prism 12 also includes an extension 16 at the bottom that may be referred to as the "side arm" of the prism 12. During operations, atomic material may be placed in the extension 12 and heated to control the vapor pressure in the prism 12 (or more broadly within cell 10). In some embodiments, the cell 10 may be heated to a temperature higher than a temperature within the extension 16 to avoid condensation of the vapor on the angled windows 14, which are separated from the cold room air by a vacuum formed within the cell 10.

In some embodiments, the vapor prism cell 10 may be operated by using the temperature within the extension 16 to control the vapor pressure within prism 12 as previously described. Alternatively, in some embodiments, the cell 10 can be operated with a fixed vapor pressure (e.g., as a so-called "starved cell" with no extension 16). Near the atomic vapor resonant absorption feature, the index of refraction changes rapidly, providing the dispersion that separates the various components of the spectrum into separate angles exiting the atomic vapor cell. For frequencies lower that the atomic resonance (to the red), the index of refraction is greater than 1, for frequencies higher than the atomic resonance (to the blue), the index of refraction is less than 1.

Figure 4:
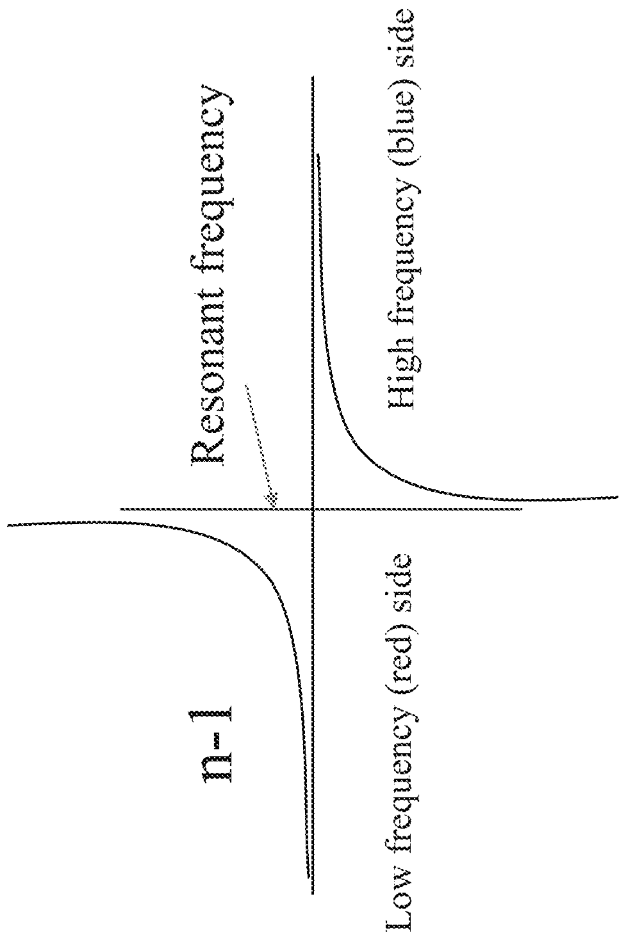
FIG. 4 is a plot of the index of refraction variation within the atomic vapor prism of FIG. 3.

FIG. 4 shows the variation in the index of refraction for an atomic transition. The strong variation of the index of refraction with frequency offset from the atomic resonance leads to separate angular displacement of each component of the Thomson spectrum at the exit of the prism cell (e.g., atomic vapor cell 10 shown in FIG. 3).

In some embodiments, the forward Thomson scattering will be collected by a collection lens and passed through the atomic vapor prism (e.g., the atomic vapor cell 10). Those spectral components far from the resonance including Rotational Raman lines will not be highly dispersed and will pass through the prism with only very small deflection. Those components lying close to the laser including Rayleigh and Ion Thomson scattering will be blocked by the atomic vapor absorption. The electron Thomson scattering will be dispersed spectrally and thus measurable with a detector array. The Thomson spectral components on the low and high frequency sides of the illumination laser fall on the high and low frequency sides of the atomic vapor resonance and will be refracted in opposite directions, providing a symmetric displacement if the laser is tuned to the center of the absorption feature. Slight tuning off resonance allows the Rayleigh light to pass, but it can be strongly attenuated and it will emerge at a very large angle due to the strong dispersion close to the absorption feature. This allows simultaneous imaging of the Rayleigh light, which can potentially be used to determine ionization fraction. This approach to spectral filtering may be achieved with an atomic vapor prism for imaging rotational Raman spectra as described in U.S. Pat. No. 6,307,626, which is incorporated herein by reference.

Figure 5:
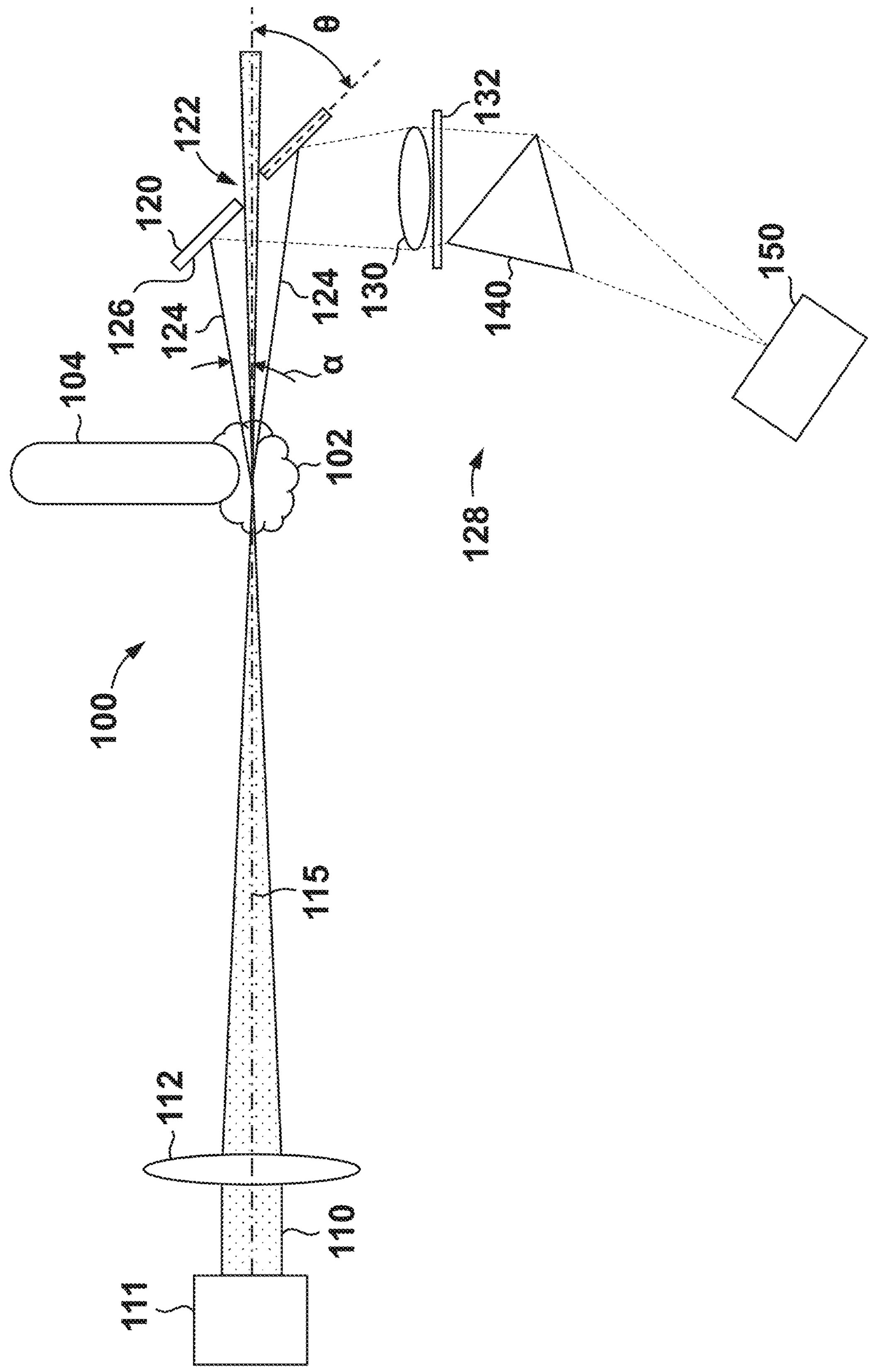
FIGS. 5-7 are diagrams of systems for measuring properties of a plasma according to some examples disclosed herein.

Referring now to FIG. 5, a diagram of a system 100 measuring properties of a plasma 102 (e.g., a weak ionized plasma) according to some embodiments is shown. Generally speaking, the system 100 includes a light emitting device 111 that outputs a beam of light 110 (e.g., a laser beam) along an axis 115. In some embodiments the light emitting device 111 comprises a laser, such as, for instance a 780 nm Ti:sapphire laser or pulse burst laser with an optical parametric oscillator (OPO). The light beam 110 output from light emitting device 111 is focused by a lens 112 along axis 115 onto plasma 102. The plasma 102 may be generated on or along a test article 104 which may comprise a surface or component that may contact plasma during use (e.g., such as a surface of a hypersonic aircraft).

After passing through the plasma 102, the light beam 110 (e.g., the beam of the laser) passes axially (e.g., with respect to axis 115) toward an angled collection mirror 120 (or more simply "mirror 120"). Because the mirror 120 collects Thomson, Rayleigh, and Raman scattering as described in more detail below, mirror 120 may also be referred to broadly as a "collector."

The mirror 120 comprises a planar or offset parabolic reflective member that captures a portion of the forward scattering produced when light beam 110 encounters plasma 102. In particular, in some embodiments, the mirror 120 comprises a planar, reflective surface 126 that is configured to reflect forward scattered light into a sensor assembly 128. As used herein, the term "forward" used in the phrases "forward scattering" and the like refers to the forward direction extending outward or away from the light source (e.g., light source 111). The mirror 120 may be positioned and arranged such that the reflective surface 126 reflects light rays 124 scattered by the plasma 102 that have a forward collection angle $\alpha$ defined between the scattered light ray 124 and the axis 115 that is less than 90°. Without being limited to this or any other theory, by collecting scattered light rays 124 having a forward collection angle $\alpha$ less than 90°, the captured Thomson scattering spectrum can be collapsed into a spectral region that has no (or little) interference from either Rayleigh or Rotational Raman spectral features as previously described. In some embodiments, the forward collection angle $\alpha$ may be less than such as less than about 15°, less than about 10°, less than about 5°, or from about 5° to about 10° relative to the axis 115 of light beam 110.

Mirror 120 has a hole 122 extending therethrough that is aligned with the axis 115. In some embodiments, the hole 122 may be centrally located along the reflective surface 126. In addition, the reflective surface 126 may be positioned at an angle $\theta$ relative to the axis 115 that may comprise approximately 45° in some embodiments. During operations, the light beam 110 from light emitting device 111 may pass along axis 115 through hole 122, while Thomson, Rayleigh, and Raman scattered rays 124 from the plasma 102 are collected in the forward direction (e.g., at the collection angle $\alpha$ as previously described) and directed toward a collection lens 130 and transmission filter 132 by reflective surface 126. The lens 130 may collect scattered light and the transmission filter 132 may suppress background illumination from the plasma 102. In some embodiments the transmission filter 132 may also encompass a narrow line interference or holographic filter to suppress Rayleigh and ion Thomson scattering.

After passing through the transmission filter 132, the Thomson, Rayleigh, and Raman scattering 124 passes through an atomic vapor prism 140. In some embodiments, the atomic vapor prism 140 may comprise the atomic vapor cell 10 shown in FIG. 3 and described above. In some embodiments, the atomic vapor prism 140 may comprise a rubidium vapor. During operations, the narrow linewidth Raleigh scattering and ion Thomson scattering may both absorbed by the vapor (e.g., the rubidium vapor) within prism 140, such that these components do not pass through prism 140. In addition, the electron Thomson scattering may be dispersed by the strong index of refraction gradient that is associated with the rubidium vapor within prism 140. Further, the Rotational Raman scattering is far from the atomic resonance of the prism 140 and is therefore not significantly dispersed thereby.

The Thomson scattering is dispersed into its spectral components by the prism 140 and those spectral components are imaged by a camera 150 (e.g., such as a intensified digital camera) such that the spectral components can be analyzed for the determination of the plasma properties. In some embodiments, the camera 150 may have enhanced sensitivity so as to enable rapid time gating to overlap the Thomson scattering from the pulsed laser source and suppress background luminosity from the plasma. Other embodiments may image the dispersed light onto a detector array to enable the measurement of the spectrum. The dispersed spectrum enables the measurement of the spectral features associated with the electron Thomson scattering shown in FIGS. 1 and 2, which may provide a measure of the electron energy distribution function yielding the electron temperature and, for high densities, the ion-acoustic wave velocities and electron density. The integrated amplitude of the measured signal may also provide a measure of the electron density. With pulsed lasers these values can be measured a precise times and locations providing notable information on plasma properties and potential plasma interactions for industrial processing control as well as for prediction of deleterious effects of plasmas surrounding hypersonic platforms.

Some embodiments may use other methods for the determination of the electron Thomson spectral feature and the elimination of the background. For instance, referring now to FIG. 6, in some embodiments the Thomson spectrum is determined by comparing different portions of the scattering spectrum captured by a series of atomic vapor filters 234*a*, 234*b*, 234*c* at different vapor pressures within a sensor assembly 228. Without being limited to this or any other theory, different vapor pressures within the atomic vapor filters 234*a*, 234*b*, 234*c* lead to different absorption bandwidths for each atomic vapor filter 234*a*, 234*b*, 234*c*.

Figure 6:
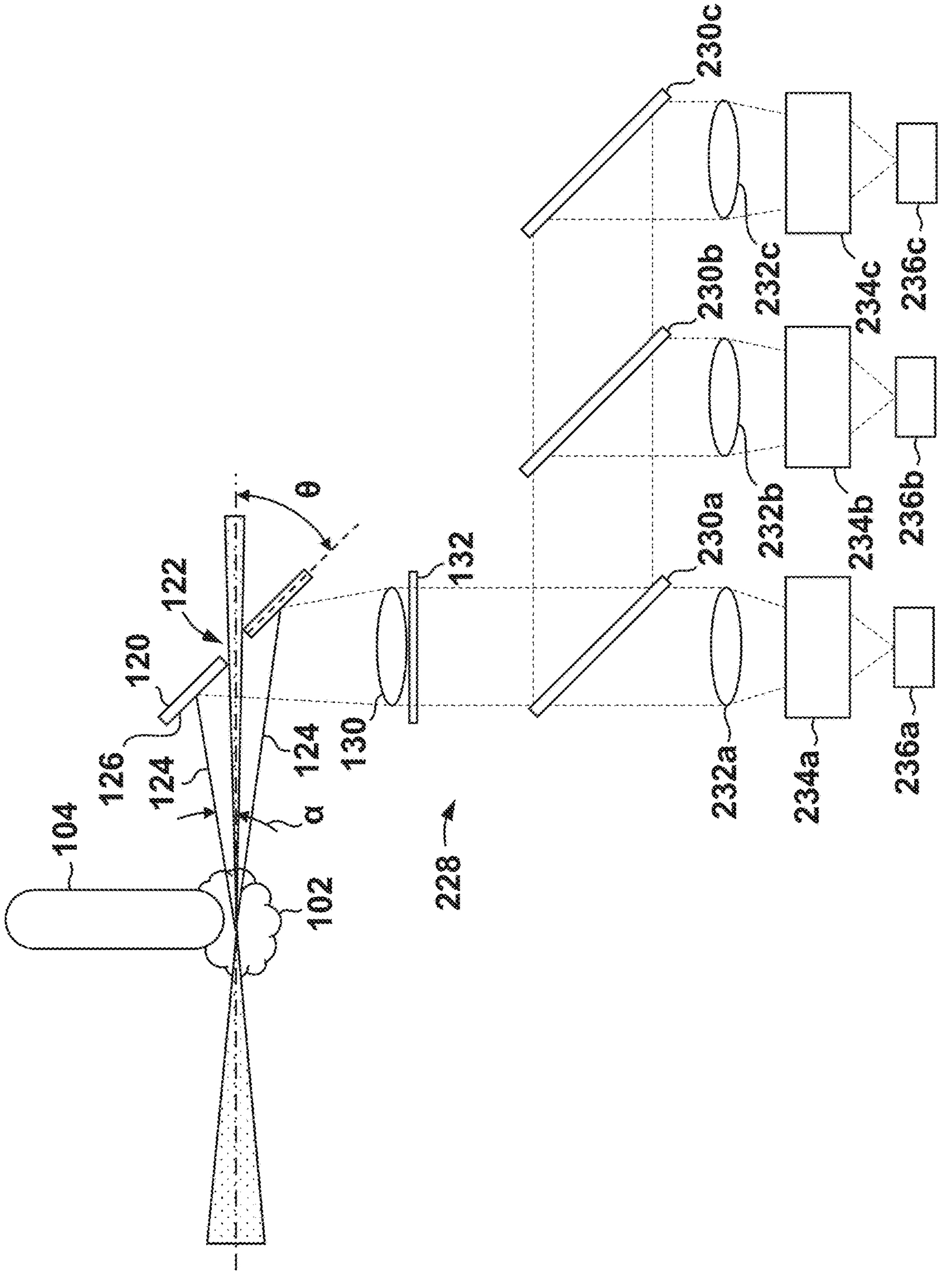

In particular, in the embodiment of FIG. 6 the light reflected off of reflective surface 126 and emitted through lens 130 and filter 132 is directed to each of the atomic vapor cell 234*a*, 234*b*, 234*c* via a plurality of partially transmitting beam splitters 230*a*, 230*b*, 230*c*. More specifically, the beam splitters 230*a*, 230*b*, 230*c* may split the light into two or more components that are each then routed through a different atomic vapor cell 234*a*, 234*b*, 234*c*, via a corresponding lens 232*a*, 232*b*, 232*c*, respectively. Each cell 234*a*, 234*b*, 234*c* suppresses the narrow linewidth Rayleigh, ion Thomson and background laser scattering while passing a portion of the electron Thomson scattering spectrum. Because each atomic vapor cell 234*a*, 234*b*, 234*c* has a different vapor pressure, the spectral components of Thomson scattering passing through each cell 234*a*, 234*b*, 234*c* differ, and by comparing the transmitted signals, the overall profile of the Thomson scattering may be retrieved, enabling a measure of the electron temperature. In some embodiments, the atomic vapor cells 234*a*, 234*b*, 234*c* may comprise a structure similar to the atomic vapor cell 10 shown in FIG. 3 and previously described above. In addition, in FIG. 6, the light emitting device 110 and lens 112 (FIG. 5) are omitted to simplify the drawing.

After passing through atomic vapor cells 234*a*, 234*b*, 234*c*. The light then passes to a plurality of light detectors 236*a*, 236*b*, 236*c*, respectively. The light detectors 236*a*, 236*b*, 236*c* may be similar to the camera 150 previously described above.

Figure 7:
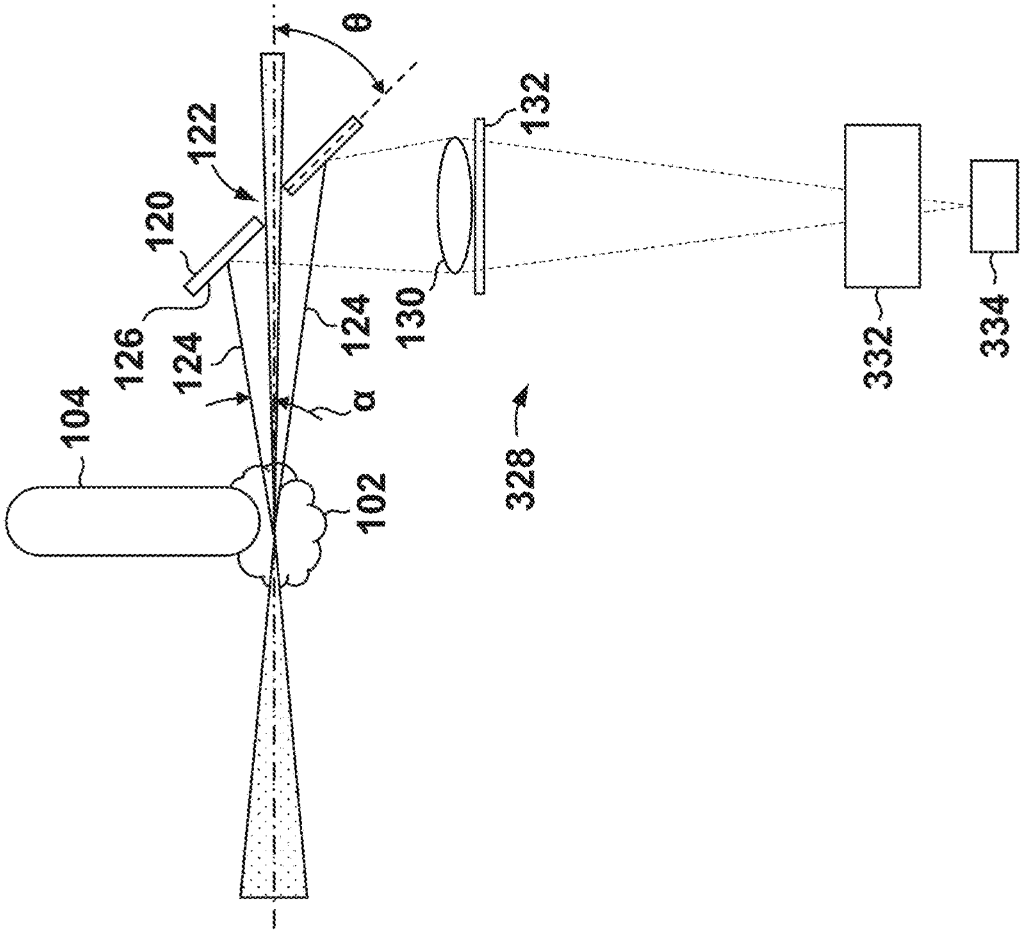

Referring now to FIG. 7, in some embodiments the collected light, after passing through lens 130 and filter 132, passes through an atomic vapor or holographic spectral filter 332 and is focused onto the entrance slit of a spectrometer 334 within a sensor assembly 328. In particular, the atomic vapor or holographic spectral filter 332 suppresses the narrow linewidth Rayleigh, Ion Thomson and background laser scattering and the spectrum of the Thomson scattering passing through that filter is resolved by the spectrometer 334. The spectrometer 334 separates the rotational Raman scattering from the narrowed Thomson scattering since their spectra do not substantially overlap, and it disperses the Thomson scattering so the lineshape and scattering strength can be determined. In some of these embodiments, further suppression of luminous background can be achieved through the use of a pulsed light source and synchronized time gated detection or a modulated light source and lock-in detection.

Another embodiment may comprise turning the illumination source 110 slightly away from the center of the filter 140 absorption so some of the Rayleigh and ion Thomson scattering also passes through filter 140, providing a simultaneous measure of those signals.

Other embodiments may make use of high discrimination interference filters or diffraction gratings. Still other embodiments may utilize slow light imaging spectroscopy (SLIS) to select specific regions of the Thomson scattering spectrum. In particular, some embodiments may utilize the SLIS techniques described in U.S. Pat. No. 10,578,489, the contents of which are incorporated herein by reference.

As previously described, sources other than a laser (e.g., illumination source 110) may also be used in some embodiments, including narrow line atomic vapor sources such as cesium, potassium, rubidium, sodium, and mercury lamps. Note that these sources emit light at their respective resonant wavelengths and thus provide the spectrally narrow illumination at just the right wavelength for an atomic filter containing the same atomic vapor. The laser or atomic vapor sources can be pulsed or continuous. Background from plasma or ionized gas luminosity is suppressed by the spectral narrowing and can be further suppressed by using either time gated detection for pulsed illumination sources or modulation and lock in detection methods for continuous sources.

The embodiments disclosed herein include systems and methods improved stand-off detection of electron properties in a plasma (e.g., a weakly ionized plasma, low temperature plasma, ionized gas region). Thus, through use of the disclosed systems and methods, properties and parameters of a plasma may be more accurately and reliably monitored during operations.

The discussion included herein is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the above-discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., central axis of a body or a port), while the terms "radial" and "radially" generally mean perpendicular to the given axis. For instance, an axial distance refers to a distance measured along or parallel to the axis, and a radial distance means a distance measured perpendicular to the axis. Further, when used herein (including in the claims), the words "about," "generally," "substantially," "approximately," and the like mean within a range of plus or minus 10%.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An apparatus for measurement of Thomson scattering signals from a plasma, the apparatus comprising:

a light emitting device, configured to emit a light beam into the plasma along as axis, where at least a portion of the light beam is scattered by the plasma;

a light collector comprising a collection surface situated at an angle relative to the axis and configured to collect the Thomson scattering from the plasma, wherein the Thomson scattering diverges from the axis of the light beam as the Thomson scattering contacts the light collector at a collection angle less than 90 degrees from the axis of the light beam whereby a spectral linewidth of the Thomson scattering is decreased; and a sensor assembly to detect the Thomson scattering.

2. The apparatus of claim 1, wherein the light emitting device is a laser emitting device, and wherein the light beam comprises a laser beam.

3. The apparatus of claim 1, wherein the collection angle ranges from approximately 5° to approximately 26° from the axis of the light beam.

4. The apparatus of claim 1, wherein the sensor assembly comprises a vapor cell configured to detect the collected Thomson scattering.

5. The apparatus of claim 4, wherein the vapor cell comprises a vapor that is configured to absorb Rayleigh and ion Thomson scattering.

6. The apparatus of claim 5, wherein the vapor comprises rubidium, cesium, potassium, sodium, mercury, or iodine.

7. The apparatus of claim 4, wherein the atomic or molecular vapor cell is configured to disperse the Thomson scattering.

8. The apparatus of claim 4, wherein the sensor assembly comprises a plurality of atomic vapor cells at different vapor pressures, wherein the plurality of atomic vapor cells are arranged to receive collected Thomson scattering therethrough.

9. The apparatus of claim 1 wherein the collection angle is configured to suppress interference from rotational Raman scattering.

10. The apparatus of claim 1, wherein the sensor assembly comprises a holographic spectral filter that is configured to filter the Thomson scattering.

11. The apparatus of claim 1, wherein the sensor assembly comprises a spectrometer that is configured to detect the collected Thomson scattering.

12. The apparatus of claim 1, wherein the collection surface comprises a reflective surface.

13. A method for measuring Thomson scattering signals from a plasma, the method comprising:

emitting a light beam into the plasma along an axis whereby at least a portion of the light beam is scattered by the plasma;

collecting the Thomson scattering from the plasma at a collection angle less than 90° from the axis of the light beam as the Thomson scattering diverges from the axis of the light beam, whereby a spectral linewidth of the Thomson scattering is decreased; and detecting the collected Thompson scattering with a sensor assembly.

14. The method of claim 13, wherein the light beam comprises a laser beam.

15. The method of claim 13, comprising reducing detection of at least one of rotational Raman spectral features, Rayleigh scattering, or ion Thomson scattering during the collecting of the Thomson scattering.

16. The method of claim 15, wherein detecting the collected Thomson scattering comprises routing the Thomson scattering through a vapor cell.

17. The method of claim 16, comprising absorbing Rayleigh and ion Thomson scattering with a vapor in the vapor cell.

18. The method of claim 16, wherein the vapor comprises rubidium, cesium, potassium, sodium, mercury, or iodine.

19. The method of claim 16, comprising dispersing Thomson scattering with the vapor cell.

20. The method of claim 16, comprising propagating light through the vapor cell.

21. The method of claim 16, wherein the detecting the collected Thomson scattering comprises passing the collected Thomson scattering through a plurality of atomic vapor cells, wherein the plurality of atomic vapor cells are at different vapor pressures.

22. The method of claim 13, comprising detecting the collected Thomson scattering with a holographic spectral filter.

23. The method of claim 13, comprising detecting the collected Thomson scattering with a spectrometer.

* * * * *